June 11, 1940.  L. PLANSKOY  2,204,049
METHOD FOR THE PRODUCTION OF IMAGES WHICH ARE GEOMETRICALLY EQUIVALENT,
APPLICABLE TO PHOTOGRAPHY AND TO CINEMATOGRAPHY
Filed July 7, 1937

Léonti Planskoy
INVENTOR
his ATTY.

Patented June 11, 1940

2,204,049

UNITED STATES PATENT OFFICE 2,204,049

METHOD FOR THE PRODUCTION OF IMAGES WHICH ARE GEOMETRICALLY EQUIVALENT, APPLICABLE TO PHOTOGRAPHY AND TO CINEMATOGRAPHY

Léonti Planskoy, Paris, France

Application July 7, 1937, Serial No. 152,298
In France July 15, 1936

1 Claim. (Cl. 88—16)

It frequently happens that it is necessary to obtain an exact superposition of several images. For instance, it is required to superpose images which are selected by means of colour filters when preparing colour photographs, or it is necessary to superpose a scene and its mask upon the image of a backing or a landscape when producing composite images. If the images are not exactly superposed, colour images are obtained which are lacking in sharpness and show fringes of colour, or composite images are obtained which have a border between the scene which is photographed and the landscape. It is indispensable, in order to obtain an exact superposition, that the various images to be superposed shall be geometrically identical, and hence they must be taken simultaneously from the same point of view. In order to obtain identical images from a given point of view, numerous beam dividing means have been proposed, which divide up a beam of light in several directions, in order to take several simultaneous views of the same scene or object. Whatever be the optical systems and the beam dividing means employed, the problem of obtaining images which are exactly identical is attended with the following difficulties.

1. The difficulty of obtaining an absolute symmetry of the optical axes of the various optical systems with reference to the plane of the films.
2. The impossibility of having two or more optical systems which are absolutely identical.
3. Different degrees of shrinking and selective hardening of the various films employed; the hardening due to the products of oxidation of the developing agent varies with the density of the picture, and the contraction of the film in its width differs from the contraction in length.

In order to obtain a perfect solution, it is thus necessary on the one hand to be free from the irregularities due to the use of various optical systems, and on the other hand, from the different degrees of contraction and hardening of the various films. Hence it would be necessary to form several images, from a given point of view, upon the same film, by means of a single optical system. The present invention has for its object to solve this problem, taking as a basis on the one hand the known principle of the reversibility of the path of the light rays in an optical system of any kind, and on the other hand, the use of known films which are not contractile, as well as the non-hardening developing of emulsions, which is also known. It is an observed fact that the known non-contractile films have but little strength and can only be used for a limited number of times in cameras and projection apparatus, and thus they cannot be used for films which are to be shown in theatres.

In conformity with the invention, in order to avoid the irregularities caused by the use of various optical systems, a principal image, real or virtual, which is formed in a determined plane by an adjustable camera lens, is multiplied simultaneously by one or more beam dividing devices and by one or more invariable auxiliary optical systems, into a certain number of similar images influencing a like number of auxiliary sensitive surfaces or a like number of distinct areas upon the same sensitive surface, and such surfaces or areas after developing, are successively projected respectively through the same dividing device or devices and the same invariable optical system or systems, in such manner as to reproduce, in the same determined plane above mentioned, exactly the same principal image, which influences the sensitive surface, which, after developing, will carry the final image or images.

On the other hand, in order to avoid the effects of the different contractions of the various films, there are employed for the auxiliary sensitive surfaces, known emulsion supports of the non-contractile type, and for the sensitive surface carrying the final image or images, a film of great mechanical strength, which is adapted for normal use in theatres, or for the printing of a great number of copies.

As to the developing of these auxiliary sensitive surfaces, use will be made of the non-hardening developing, for instance the physical developing.

The accompanying diagrammatic drawing shows by way of example, various arrangements by which the invention may be carried into effect.

A description will be given in the first place, of an example of the use of the invention for the production of composite images, with reference to Figs. 1, 2 and 3 of the accompanying drawing.

The question relates, for instance, to the formation of a composite image by means of a subject (objects or actors) and a landscape which are photographed separately.

Figure 1:
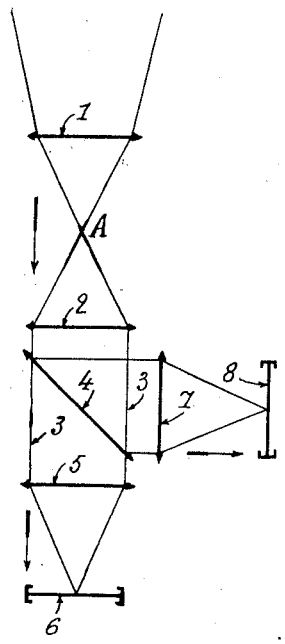
Figs. 1, 2 and 3 represent the three stages of a method for the production of composite images.

Fig. 1 represents one of the arrangements which may be adopted for obtaining two images of the subject taken from the same point of view. A focussing lens of any kind 1, gives at A an image of the subject which is placed at any suitable distance against an illuminated monochromatic backing, said backing being so chosen that its colour is different from the colour or colours of the subject. The rays, after passing through a collimator 2 whose focus is at A, emerge as a beam of parallel rays 3. A beam splitter of any kind 4, gives passage to a part of the parallel beam 3, which passes through a lens 5 and influences a sensitive film 6 of the non-contractile type, and this, after developing, will give a negative 6ᵃ of the subject on a dense backing. The other part of the beam 3, which is deflected by the beam splitter 4, passes through a filter (not shown) the colour of which is complementary to that of the monochromatic backing, and then through a lens 7, in order to form upon the sensitive film 8, which is also of the non-contractile type, a latent image which, if it were developed, would give a negative image of the subject on a transparent backing. In order to avoid the dependence between the colours of the subject and of the monochromatic backing, instead of forming the two latent negative images by the use of a monochromatic backing, use may be made of an illuminated backing coated for instance with a pigment, such as chloramine black, which since it appears black to the eye will record little or no density when photographed upon the film 8 sensitized only to radiations comprised within the visual spectrum, but which since it freely transmits and consequently permits the reflection from the backing in the invisible spectrum between 840 mu–900 mu (NB. cf. Veröffentlichungen des Wissenschaftlichen Zentral-Laboratoriums der Photographischen Abteilung Agfa 1935—Vol. IV, p. 109) will record with high density upon the film 6 chosen so as to be sensitive to that region of the spectrum through a colour filter absorbing the visual spectrum (NB. Wratten N 87 Infra Red filter see Wratten Light Filters, Eastman Kodak Company publication Rochester No. 4, 1936, 14 edition page 67). It is also possible to obtain the two latent negative images by placing the actors or the subject before a backing lighted by light which is polarized, whilst the actors or subject is lighted by ordinary non-polarized light; the first view is taken in the usual manner and the second view is taken by placing in the path of the rays an analyser which extinguishes the polarized light.

In order to produce the mask of the subject which is required to form the composite image, it is necessary to develop the negative image formed on the emulsion 6, and to copy this developed image upon the emulsion 8 carrying the latent negative image of the subject. In order to avoid all the errors due to the various causes above mentioned, I maintain in the same position as in Fig. 1, the collimator 2, the beam splitter 4, the lenses 5 and 7 and the emulsion 8 carrying the latent negative image of the subject, and as shown in Fig. 2, I dispose at A a mirror or a diffuser 9, and I place the emulsion 6ᵃ carrying the developed image upon a dense backing, exactly in the same position that was occupied by the undeveloped emulsion 6 when the views were taken as shown in Fig. 1, and the image carried by this emulsion 6ᵃ is projected by means of an illuminant 10. On the principle of the reversibility of the path of the rays of light through any optical system, the rays starting from the emulsion 6ᵃ and passing through the lens 5 will exactly reproduce the beam 3 of parallel rays which had produced the image. This beam 3 will also pass through the beam splitter 4 and will then meet, in the plane of the focus of the collimator 2, the mirror or diffuser 9, which sends the beam, on exactly the same path, upon the beam splitter 4, which deflects a part of this beam through the lens 7, thus influencing, the sensitive emulsion 8. It will be observed that in this manner, the emulsion 8 is printed upon by the image carried by the developed emulsion 6ᵃ, exactly as if it were exposed to the subject in conditions which are exactly the same as those prevailing when the views were taken according to Fig. 1. The two images will thus be in exact coincidence, and the emulsion 8, after developing, will give a correct mask 8ᵃ of the subject.

Figure 3:
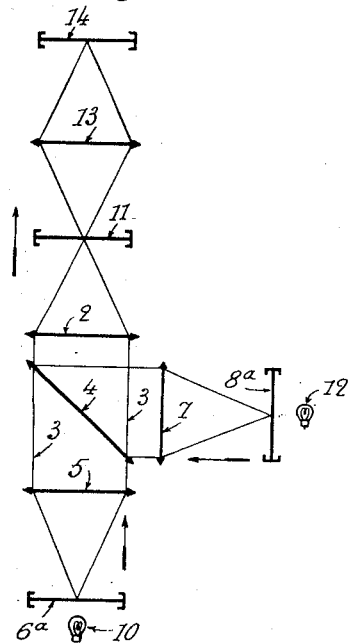
Figure 2:
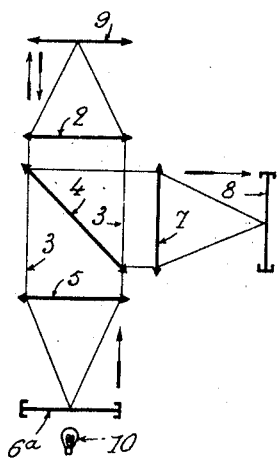

In order to produce the composite image with the negative 6ᵃ, the mask 8ᵃ and a negative 11 of a background scenery or landscape which has been photographed separately in the usual manner, I preserve in the same position as in Fig. 2, the collimator 2, the beam splitter 4, the lenses 5 and 7, and the emulsion 6ᵃ carrying the negative of the subject on a dense backing, and as shown in Fig. 3, I replace at A the mirror or diffuser 9 by the negative 11 of the background scenery or landscape, then placing the developed emulsion 8ᵃ forming the mask, exactly in the same position that was occupied by the undeveloped emulsion 8 during the preceding operations, and by means of the illuminant 12, the mask 8ᵃ is projected through the lens 7, the beam splitter 4, the lens 2, the negative 11 and an objective lens 13, upon the sensitive film 14 of the type having a great mechanical strength, thus producing on this film 14 a latent positive image of the landscape in which the part reserved for the scene remains unexposed. It is then simply necessary to remove the negative 11 of the landscape and to project, by means of the illuminant 10, the image carried by the emulsion 6ᵃ through the lens 5, the beam splitter 4, the lens 2 and the objective lens 13, upon the latent image of the landscape which has just been formed upon the film 14, and then to develop the images carried by the film 14.

Figure 4:
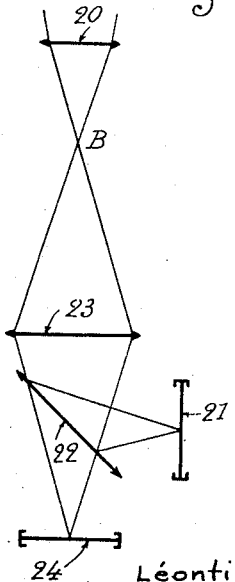
Fig. 4 shows a modified arrangement for the same purpose.

The preceding arrangement is given simply by way of explanation, and the optical systems might be mounted in quite another manner. Thus, as shown in Fig. 4, an adjustable camera lens 20 may form at B an image which is taken up by an objective lens 23 having a fixed position, and is projected through a beam splitter 22 upon sensitive surfaces 21 and 24 which are also situated in fixed planes. After developing the image on the surface 24, this image is projected through the objective 23 in such manner as to reconstitute the main image B, which—by a mirror or diffuser—is sent upon the latent image 21, and this, after developing, will form the mask.

The beam splitter may be placed either in front or in the rear of the objective 23. If the beam-splitter is placed in front of the objective 23, it will be necessary to provide as many objectives similar to this objective 23 as there are images to be obtained simultaneously.

It will be advantageous to place in the vicinity of the plane A or B of the main image, two field lenses, whereof one is located at the focus of the adjustable camera lens and follows this latter in its movements, and the other is located at the focus of the invariable optical system, in such way as to constantly project the opening of the rays issuing from the objective upon the opening of incidence of the invariable system.

In the application of the invention to colour photography, it is simply necessary to form, in a determined plane, by means of an adjustable camera lens, a main image of the scene or subject to be photographed, and this image is multiplied, by means of a beam splitter and of one or more auxiliary invariable optical systems, with the interposition of colour filters, so as to form a certain number of auxiliary selected images produced upon a like number of auxiliary sensitive surfaces of the non-contractile type, which after a non-hardening developing, will be projected successively through the same beam splitter and the same invariable optical system or systems, upon different areas of a given sensitive film having a great mechanical resistance. After developing, there are obtained upon this latter film selected images which are absolutely identical and can be perfectly superposed, and these can be utilized for the printing of copies by the known subtractive or additive methods which will then serve for the projection.

In the case in which it is desired to produce composite images in colours, it is feasible to produce, as in the preceding case, in a given plane, by means of an adjustable camera lens, a main image of the scene or the subject to be photographed, and this image is multiplied through a beam splitter and one or more auxiliary invariable optical systems, in such manner as to form simultaneously a number of latent images, greater by one unit than the number of images selected by colour filters which it is desired to obtain (or three images in the case of two-colour photography, four images in the three-colour process, etc.), these images being situated in the planes of auxiliary sensitive surfaces of the non-contractile type, which will thus be exposed. For the selected latent images, the necessary colour filters are then placed in the path of the light beams. As to the additional latent image, this is taken in such manner, as to appear on a transparent backing if it were developed, i. e., there is inserted, for instance, in the path of the light rays by which it is formed, a filter the colour of which is complementary to the monochromatic colour of the backing upon which the scene or the subject is photographed, or preferably, the scene or subject will be placed before a light backing, which is lighted by polarized light, then inserting in the path of the light rays an analyser adapted to cut off the polarized light, or again use will be made of infra-red radiations, as above explained with reference to Figure 1. The selected images are then developed by the non-hardening process, and they are projected simultaneously or successively upon the latent additional image upon a light backing, by operating for each developed selected image as above set forth in the first example described, i. e. the projection will take place through the optical system which served to produce the selected image and through the optical system which served to produce the additional image, while placing a reflecting or a diffusing device at the combined and common focus of these two optical systems. After a non-hardening developing of the additional image, the result will be a mask of the scene or subject to be photographed. It will then be sufficient, for each of the selected images, to first project the mask upon an unexposed film having a great mechanical resistance, through the negative of a back-ground or landscape, and then to project the selected image upon the same surface of this unexposed film. This will produce, after developing, and upon the same film, a set of composite selected images, each for a particular colour.

In the use of lenticular films for the production of the colour films, the beam splitters consist of lenticular elements which are incorporated into the support. In this case, care should be taken that there are no differences between the image and the aperture of the objective lens when the views are being taken, and during the projection or the printing, as such differences would bring colour dominants upon parts of the image. The invention permits of keeping this distance constant, and hence the invention is equally applicable to the case in which lenticular films are employed.

In the case of Figs. 1, 2 and 3, it has been supposed that only a single scene or object was superposed upon a background or landscape, but it is evident that the invention is also applicable to the case in which it is necessary to superpose several distinct scenes or objects upon the same background or landscape.

It is obvious that the preceding explanations are given solely by way of example. The positives may be replaced by negatives, and the negatives by positives. The optical arrangements herein represented are indicated simply in order to set forth the principle of the invention, but they may be replaced by any other suitable optical systems.

Having now described my invention what I claim as new and desire to secure by Letters Patent is:

A photographing method, which consists in placing two auxiliary photosensitive elements in two planes situated at foci conjugate with a focus common to two invariable optical systems, providing an illuminated uniform background adapted to transmit selectively radiations incident upon it, preventing the passage of the selected radiations transmitted by said background in the first optical system, forming in the plane of said common focus an optical image of an illuminated subject placed before said illuminated background, whereby latent images of said subject are formed on said auxiliary elements with a background having no density on the first element and with a dense background on the second element, developing the latent image with a dense background on the second element, placing again said second developed auxiliary element in the same position in its corresponding plane with respect to the second optical system, illuminating said second developed auxiliary element and redirecting the beam issued from said second optical system through the first optical system whereby another latent image is formed on the first auxiliary element and developing said first auxiliary element, whereby a mask of the subject is obtained on a transparent background, proceeding then successively and in any desired order to the two following steps the one consisting in placing said first element carrying the mask exactly in its former position with respect to said first optical system, disposing in the plane of said common focus a picture of a background scenery, projecting said first auxiliary element through said first optical system and through said picture on a principal sensitive element, and the second consisting in removing said picture and projecting said second auxiliary element through said second optical system on said principal sensitive element, and finally developing said principal sensitive element.

LÉONTI PLANSKOY.